United States Patent
Chen et al.

(10) Patent No.: US 10,313,302 B2
(45) Date of Patent: Jun. 4, 2019

(54) METHODS FOR NAT (NETWORK ADDRESS TRANSLATION) TRAVERSAL AND SYSTEMS USING THE SAME

(71) Applicant: Synology Inc., Taipei (TW)

(72) Inventors: Kan-Yueh Chen, Taoyuan (TW); Tsung-Wei Wang, Kaohsiung (TW); Jia-Yu Liu, New Taipei (TW)

(73) Assignee: SYNOLOGY INC., Taipei (TW)

( * ) Notice: Subject to any disclaimer, the term of this patent is extended or adjusted under 35 U.S.C. 154(b) by 82 days.

(21) Appl. No.: 15/240,376

(22) Filed: Aug. 18, 2016

(65) Prior Publication Data

US 2017/0085523 A1    Mar. 23, 2017

Related U.S. Application Data

(60) Provisional application No. 62/219,786, filed on Sep. 17, 2015.

(30) Foreign Application Priority Data

Mar. 17, 2016 (TW) .............................. 105108222 A

(51) Int. Cl.
  *H04L 29/12* (2006.01)
  *H04L 12/733* (2013.01)
  *H04L 12/741* (2013.01)

(52) U.S. Cl.
  CPC ............ *H04L 61/256* (2013.01); *H04L 45/20* (2013.01); *H04L 45/74* (2013.01); *H04L 45/745* (2013.01); *H04L 61/2575* (2013.01)

(58) Field of Classification Search
  CPC .............................. H04L 61/256; H04L 45/20

USPC ......................................................... 370/392
See application file for complete search history.

(56) References Cited

U.S. PATENT DOCUMENTS

| 2004/0024879 | A1* | 2/2004 | Dingman | H04L 29/06027 709/227 |
|---|---|---|---|---|
| 2006/0072569 | A1 | 4/2006 | Eppinger et al. | |
| 2006/0095401 | A1* | 5/2006 | Krikorian | H04L 29/06027 |
| 2008/0148378 | A1* | 6/2008 | Wing | H04L 29/12386 726/11 |
| 2010/0069127 | A1* | 3/2010 | Fiennes | H04W 52/028 455/574 |
| 2011/0252238 | A1* | 10/2011 | Abuan | H04L 61/2575 713/168 |
| 2012/0087302 | A1* | 4/2012 | Chaturvedi | H04L 67/104 370/328 |

(Continued)

OTHER PUBLICATIONS

European Search Report dated Feb. 17, 2017, issued in application No. 16189250.0-1505.

(Continued)

*Primary Examiner* — Peter G Solinsky
(74) *Attorney, Agent, or Firm* — McClure, Qualey & Rodack, LLP

(57) ABSTRACT

The invention introduces a method for NAT (Network Address Translation) traversal, performed by a processing unit of a node, which contains at least the following steps: issuing an initial packet to an intermediate server through a router, in which the initial packet at least contains ID (identity) information of the node; and periodically sending packets to a black hole through the router, so that the router maintains session information between the node and the black hole.

15 Claims, 9 Drawing Sheets

(56) References Cited

U.S. PATENT DOCUMENTS

2012/0113800 A1* 5/2012 Arsenault ............ H04K 3/222
                                                                370/220

OTHER PUBLICATIONS

Muller, A., et al.; "Autonomous NAT Traversal;" IEEE; Aug. 2010; pp. 1-4.
Anonymous; "UDP hole punching;" Wikipedia; Feb. 2017; pp. 1-3.

* cited by examiner

METHODS FOR NAT (NETWORK ADDRESS TRANSLATION) TRAVERSAL AND SYSTEMS USING THE SAME

CROSS REFERENCE TO RELATED APPLICATIONS

This Application claims the benefit of U.S. Provisional Application No. 62/219,786, filed on Sep. 17, 2015, and Taiwan Patent Application No. 105108222, filed on Mar. 17, 2016, the entirety of which is incorporated by reference herein.

BACKGROUND

Technical Field

The present invention relates to NAT (Network Address Translation), and in particular, to methods for NAT (Network Address Translation) traversal and systems using the same.

Description of the Related Art

NAT (Network Address Transition) traversal (also known as Hole Punching) is a computer networking methodology used to establish a connection between two devices which are unaware of each other because of the NAT. To implement the NAT traversal, the system usually needs an intermediate server, such as a STUN (Session Traversal Utilities for NAT) server or an ICE (Interactive Connectivity Establishment) server, to exchange the external address of devices which are behind the NAT. The workflow of the intermediate server is simple: It records the external address of the client when a connection is established between them. Once another client (client B, for example) wants to establish a connection to client A, which is behind the NAT, client B will issue a punch request to the intermediate server. Then, the intermediate server will help exchange the external address of client A and client B so that they can start processing the NAT traversal. This NAT traversal methodology is affected by the NAT mechanisms which may lead to the following drawbacks: First, to keep the connection record between the client and the intermediate server alive in the NAT session table, the client has to periodically send packets to the intermediate server, and thus puts a heavy loading on the server. Second, the intermediate server cluster cannot be scaled in or scaled out arbitrarily because this would make information exchange difficult. Thus, it is desirable to have methods for NAT (Network Address Translation) traversal and systems using the same to address the aforementioned drawbacks.

BRIEF SUMMARY

An embodiment of the invention introduces a method for NAT (Network Address Translation) traversal, performed by a processing unit of a node, which contains at least the following steps: issuing an initial packet to an intermediate server through a router, wherein the initial packet comprises ID (identity) information of the node; and periodically sending packets to a black hole through the router, so that the router maintains session information between the node and the black hole.

An embodiment of the invention introduces another method for NAT traversal, performed by a processing unit of an intermediate server, which contains at least the following steps: receiving a punch request from a first node, wherein the punch request comprises ID information of a second node; and faking an error packet between a black hole and the second node and issuing the error packet to the second node, wherein the payload of the error packet comprises an external address of the first node.

An embodiment of the invention introduces a system for NAT traversal, which contains at least a first node issuing an initial packet to a first intermediate server through a router, wherein the initial packet comprises ID (identity) information of the first node; determining the router's NAT type; and, when the NAT type is not a symmetric NAT, periodically sending packets to a black hole through the router, so that the router maintains session information between the first node and the black hole.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the well-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
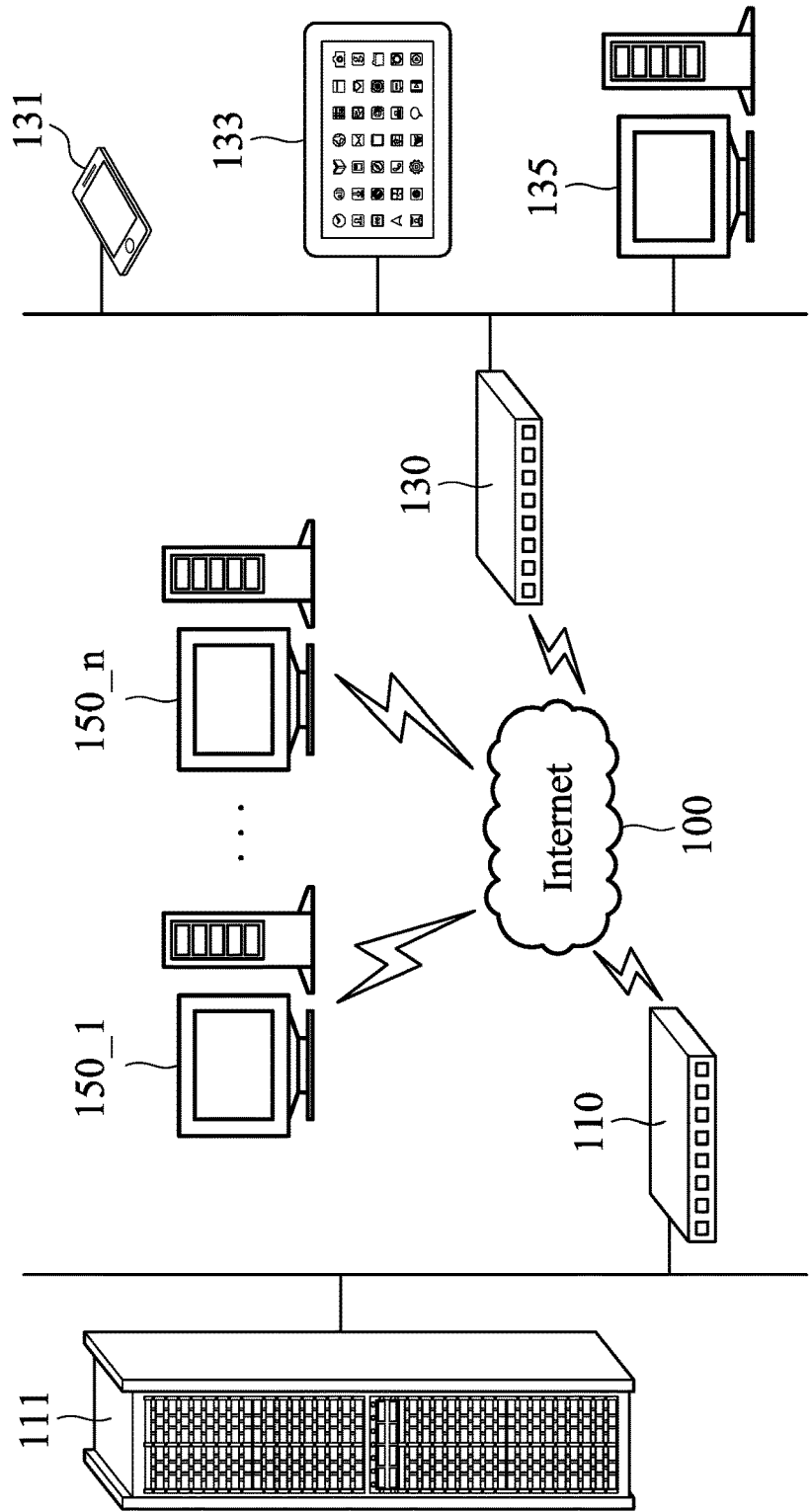
FIG. 1 is a schematic diagram of the network architecture of the NAT (Network Address Transition) traversal system according to an embodiment of the invention.

FIG. 1 is a schematic diagram of the network architecture of the NAT (Network Address Transition) traversal system according to an embodiment of the invention. The network architecture contains routers 110 and 130. Each of the routers 110 and 130 forwards network packets between computer networks. A network packet is typically forwarded from one router to another through the networks that constitute the internetwork until it reaches its destination node. The router is connected to two or more data lines from different networks. When a network packet comes in on one of the lines, the router reads the address information in the packet to determine its ultimate destination. Then, using information in its routing table or routing policy, the router directs the network packet to the next network. Any of the routers 110 and 130 may be a home or small office router that simply passes data, such as web pages, email, IM (Instant Messages), audio streams, video streams, etc., between the connected machine and the Internet. Each of the routers 110 and 130 implements NAT for mapping multiple private devices to one public IP (Internet Protocol) address. In a typical configuration, a local network uses one of the designated private IP address subnets. The router on the local network has a private address in that address space and is also connected to the Internet 100 with a public address assigned by an Internet service provider. As a network packet passes from the local network to the Internet 100, the source address in each packet is translated on the fly from a private address to the public address. The router tracks basic data regarding each active connection (particularly the destination address and port). When a reply returns to the router, it uses the connection tracking data the router stored during the outbound phase to determine the private address on the local network to which to forward the reply.

The NAS (Network-Attached Storage) system 111 is connected to the router 110 through the local network and provides data access to a heterogeneous group of clients, such as the mobile phone 131, the tablet computer 133, the personal computer 135, etc. The NAS system 111 contains one or more storage drives, often arranged into RAID (Redundant Array of Independent Disks). The mobile phone 131, the tablet computer 133 and the personal computer 135 connects to the router 130 through a LAN (Local Area Network). Although the NAS system 111 is shown in the embodiment as a client, it is understood that alternative embodiments are contemplated, such as a smart TV (television), a surveillance system, a video player, etc. The intermediate servers 150_1 to 150_n form a cluster for storing ID (identity) and external addresses of clients, such as the mobile phone 131, the tablet computer 133, the personal computer 135, the NAS system 111. The client may request any of the intermediate servers 150_1 to 150_n for obtaining the external addresses of the other clients.

Figure 2:
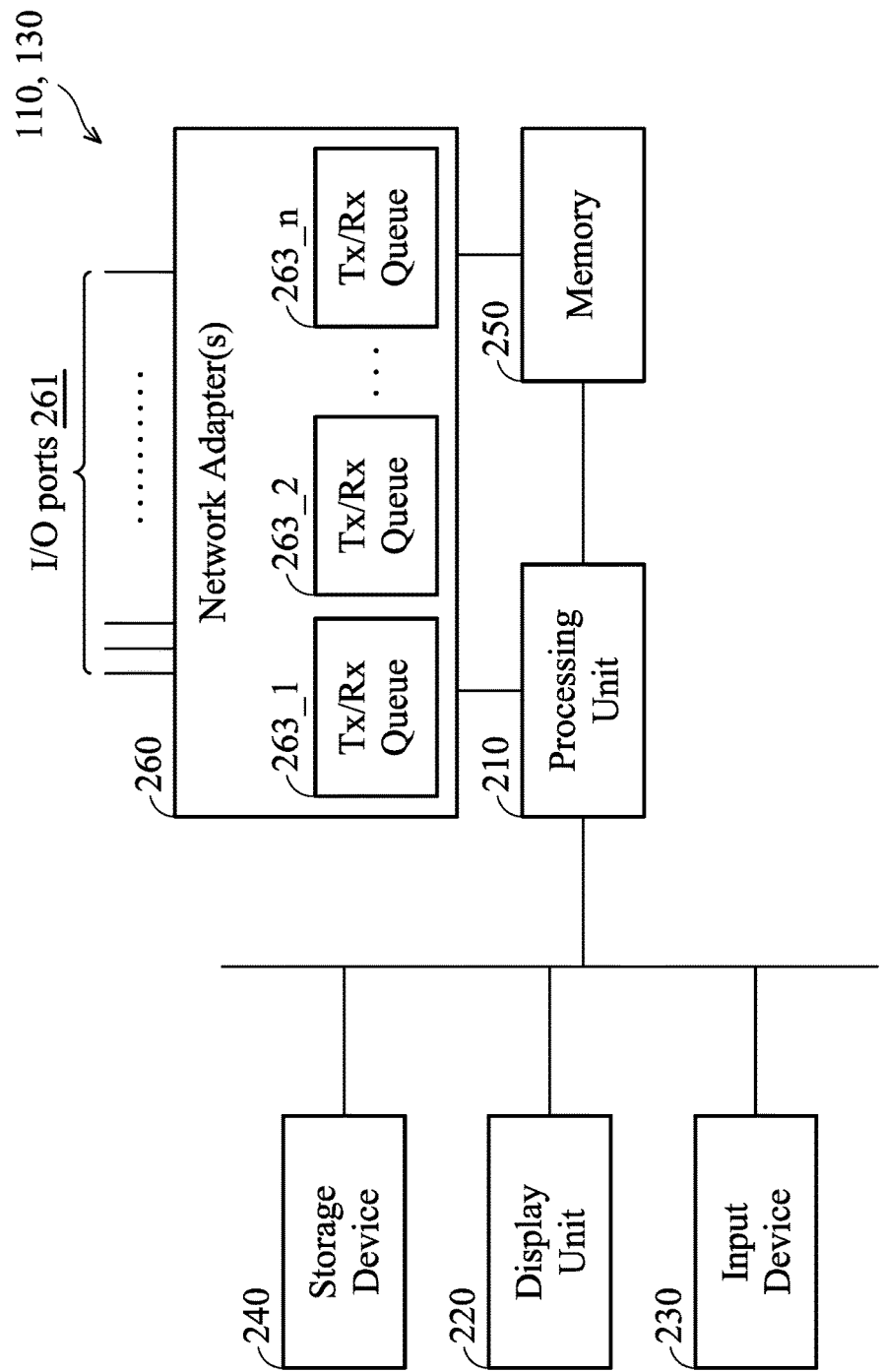
FIG. 2 is the system architecture of a router according to an embodiment of the invention.

FIG. 2 is the system architecture of a router according to an embodiment of the invention. The system architecture may be practiced in any of the routers 110 and 130. The router is configured to receive network packets and, ultimately, determine an output node to transmit the network packets out of the router. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes the memory 250 for storing necessary data in execution, such as variables, data tables, data abstracts, or others, and the storage device 240 for storing data. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a one-click, a double-click, a single-finger dragging, and a multiple finger dragging. A display device 220, such as a TFT-LCD (Thin film transistor liquid-crystal display) panel, the OLED (Organic Light-Emitting Diode) panel, or others, may also be included to display input letters, alphanumeric characters and symbols for the user to view. The network adapters 260 may be configured to communicate using an Ethernet communications capable of permitting communication using a TCP/IP (Transmission Control Protocol/Internet Protocol), UDP (User Datagram Protocol), and/or other communications protocols. The network adapter(s) 260 include multiple ports 261 and each port 261 may be configured as an internal port or an external port. The network adapter(s) 260 may include multiple Tx/Rx (transmit and/or receive) queues 263-1 to 263-n configured to cache network data, which will be transmitted and/or has been received.

Figure 3:
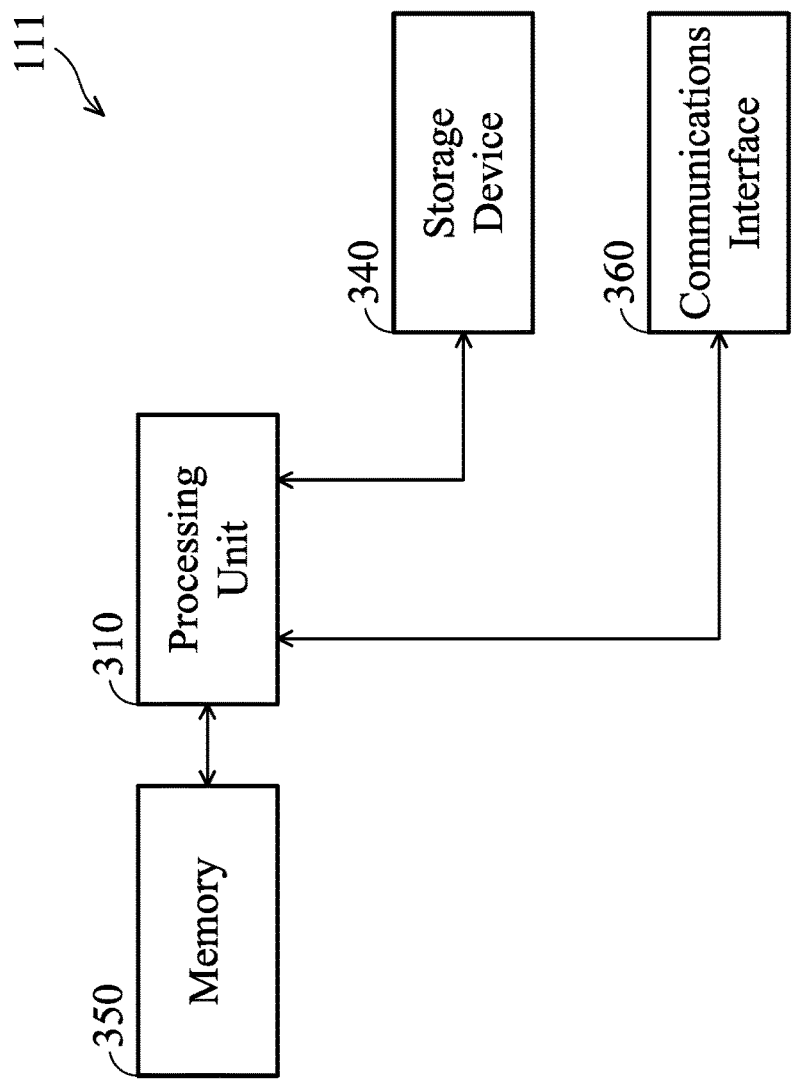
FIG. 3 is the system architecture of a NAS system according to an embodiment of the invention.

FIG. 3 is the system architecture of a NAS system according to an embodiment of the invention. The processing unit 310 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes the memory 350 for storing necessary data in execution, such as variables, data tables, data abstracts, or others. The storage device 340 may be configured as RAID and stores a wide range of electronic files, such as Web pages, documents, video files, audio files, or others. A communications interface 360 is included in the system architecture and the processing unit 310 can thereby communicate with other electronic apparatuses. The communications interface 360 may be a LAN communications module, a WLAN (Wireless Local Area Network), or any combination thereof.

Figure 4:
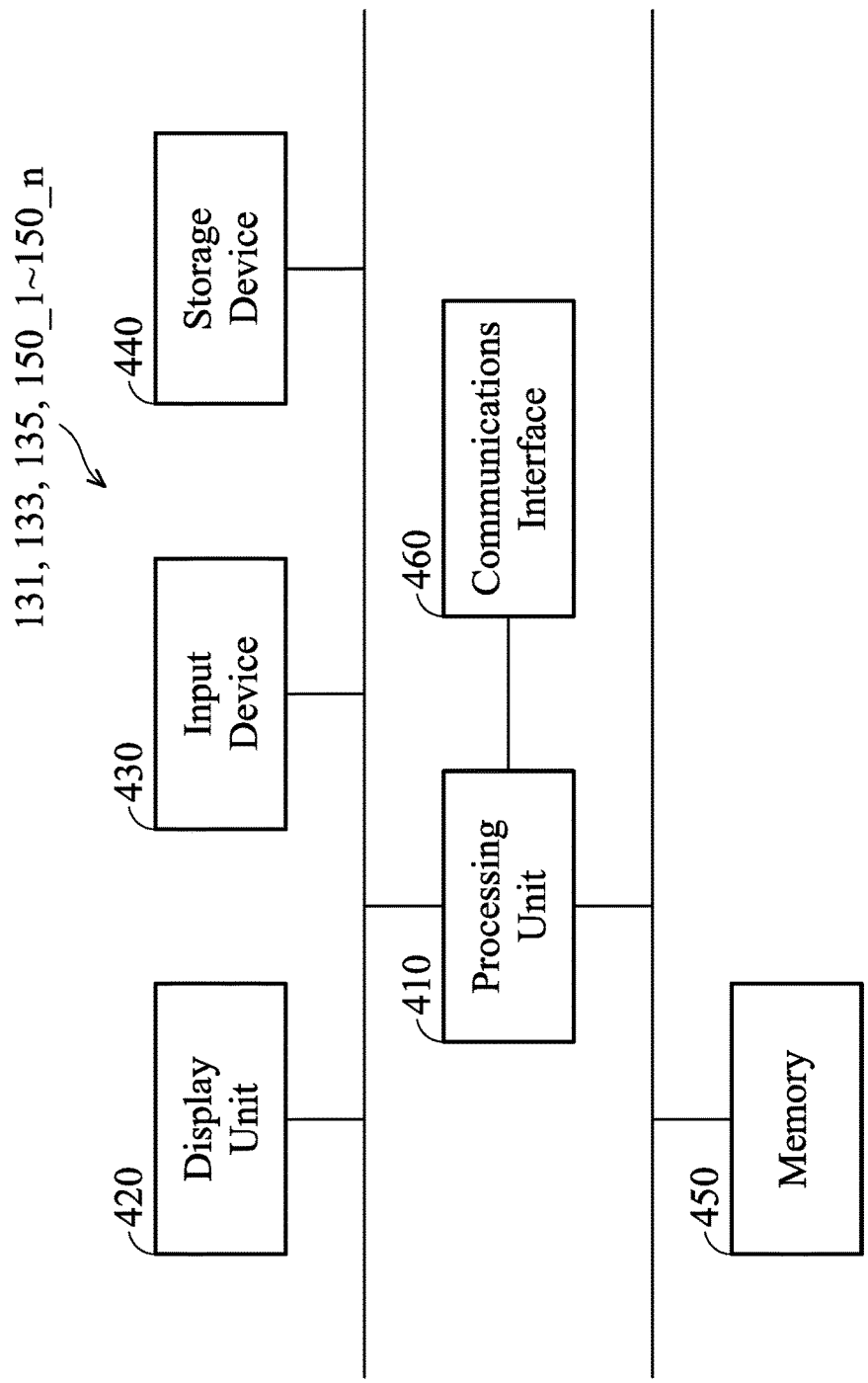
FIG. 4 is the system architecture of a client according to an embodiment of the invention.

FIG. 4 is the system architecture of a client according to an embodiment of the invention. The system architecture may be practiced in any of the mobile phone 131, the tablet computer 133, the personal computer 135 and the intermediate servers 150_1 to 150_n, or an electronic apparatus capable of complicated computation. A processing unit 410 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 450 for storing necessary data in execution, such as runtime variables, data tables, etc., and a storage device 440 for storing a wide range of electronic files, such as Web pages, documents, video files, audio files, or others. A communications interface 460 is included in the system architecture and the processing unit 410 can thereby communicate with other electronic apparatuses. The communications interface 460 may be a LAN communications module or a WLAN (Wireless Local Area Network). The system architecture further includes one or more input devices 430 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 420, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for the user to view.

Figure 5A:
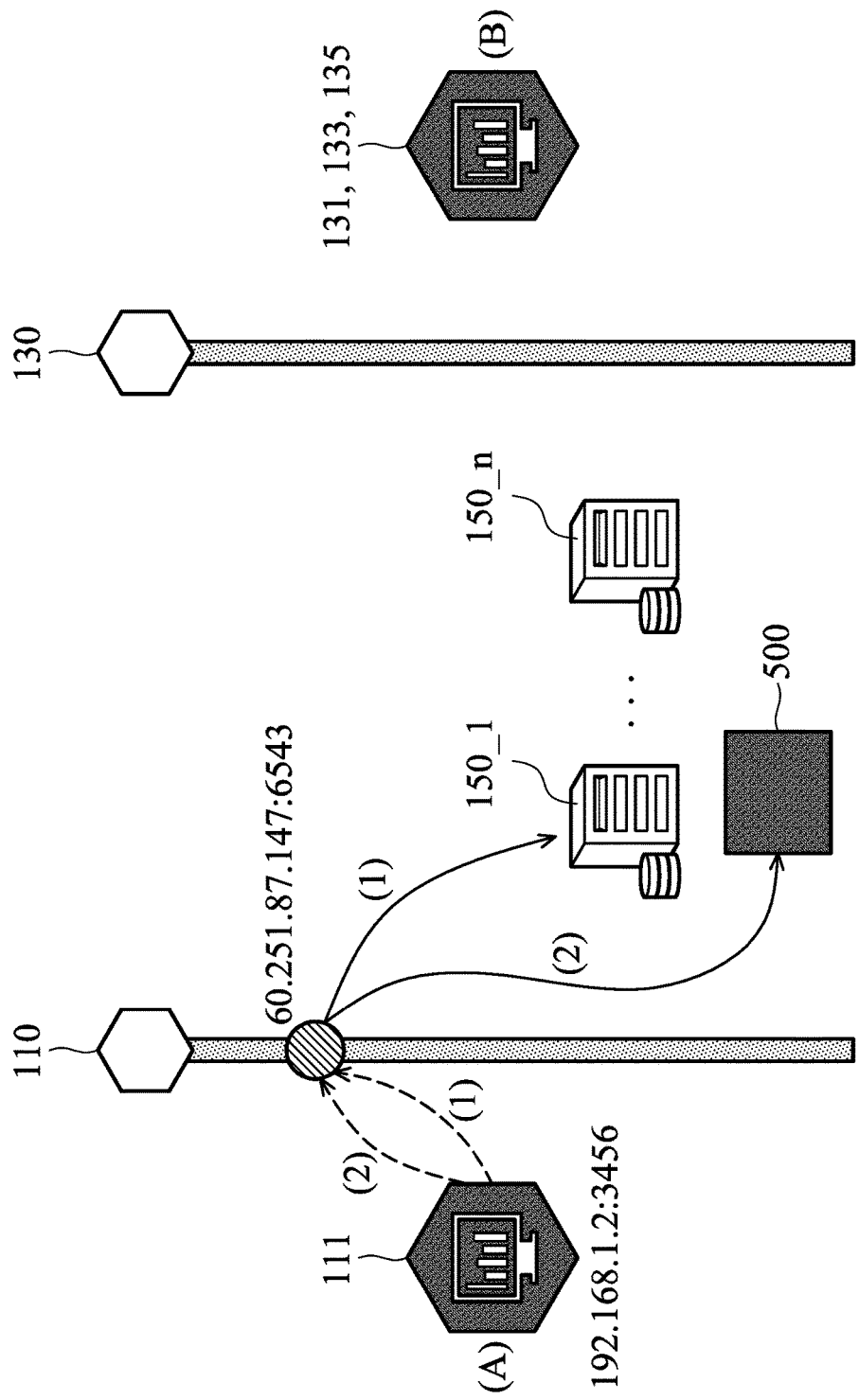
FIG. 5A to 5C are schematic diagrams of NAT traversal according to an embodiment of the invention.
Figure 5B:
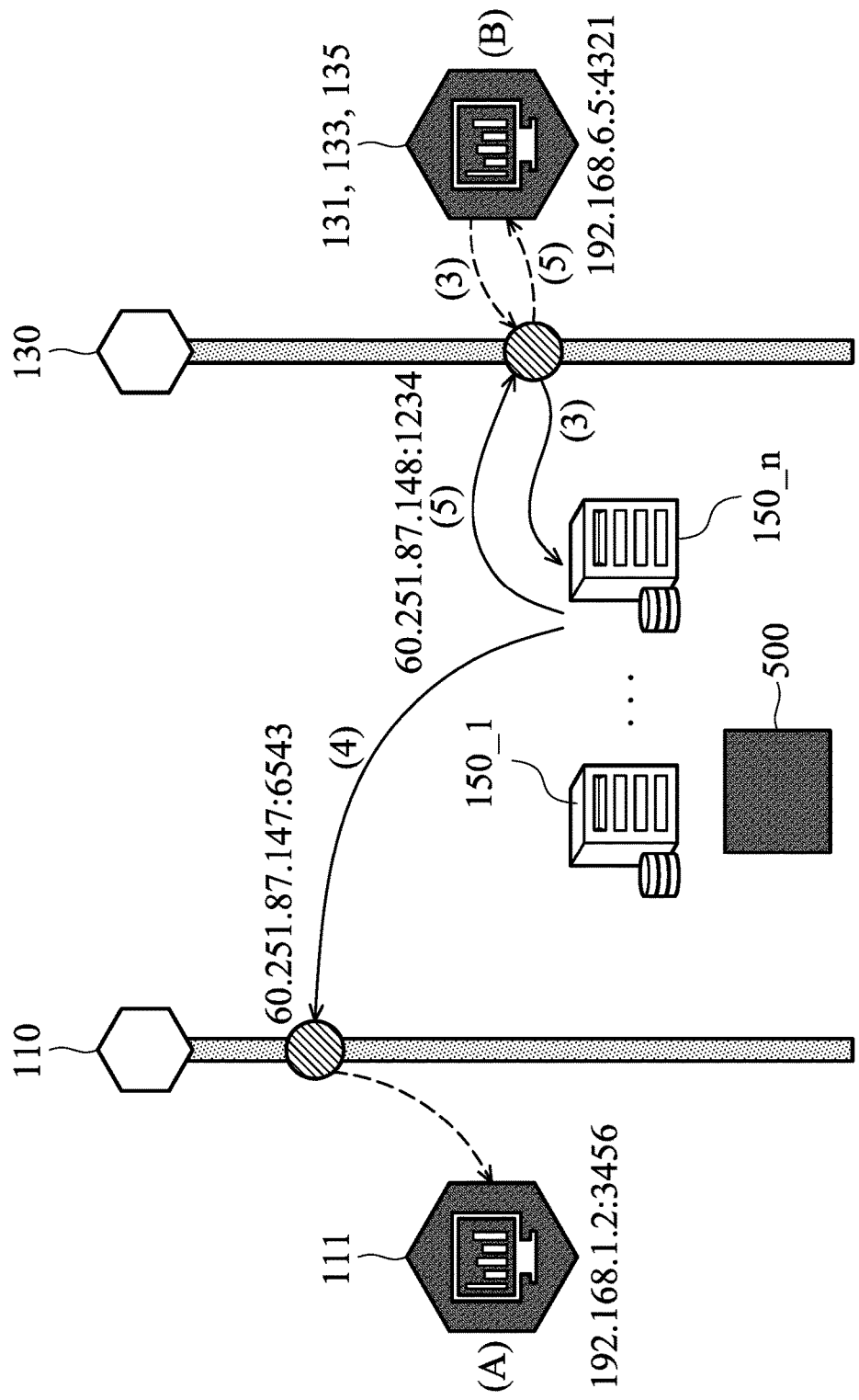
Figure 5C:
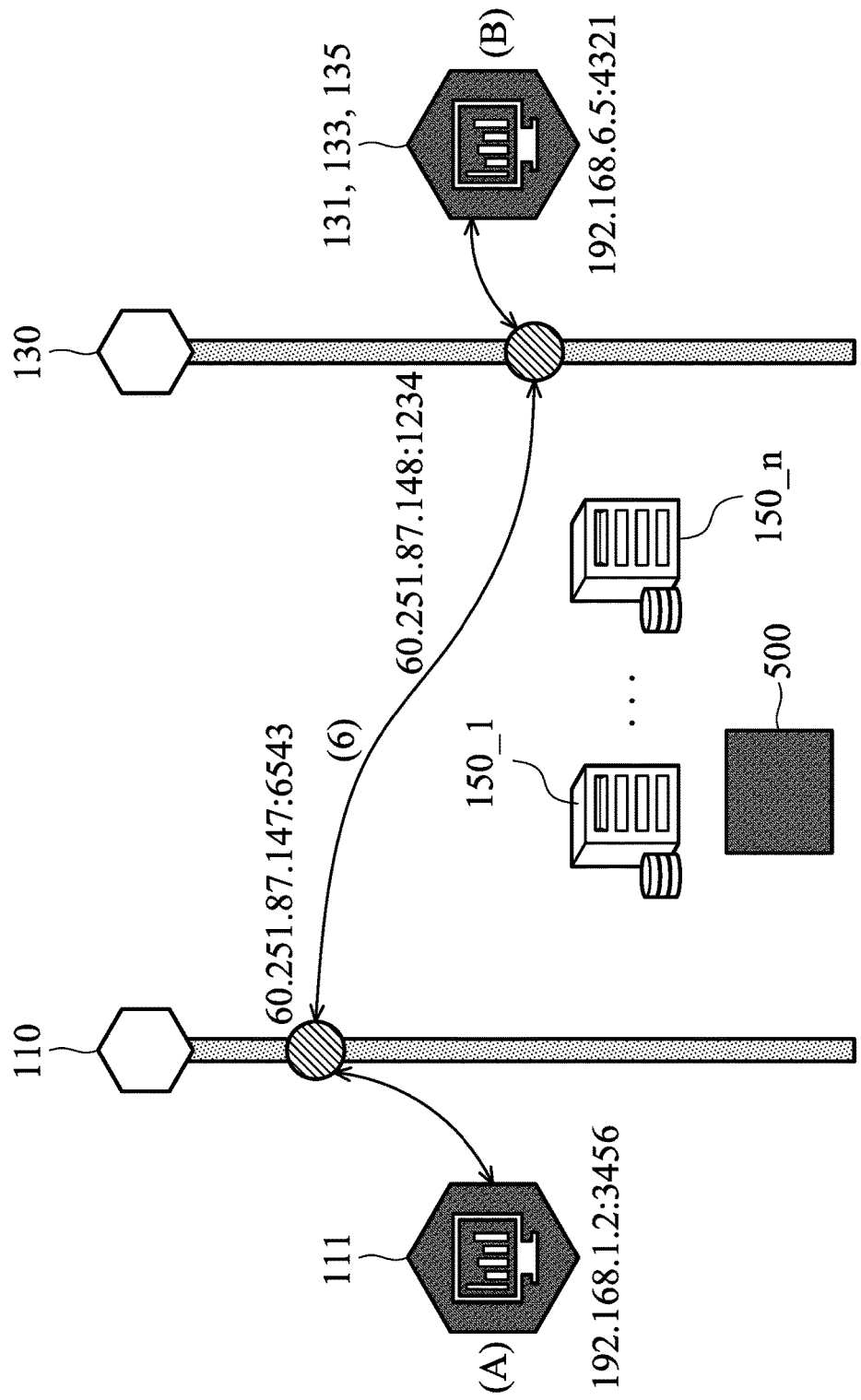
Figure 6:
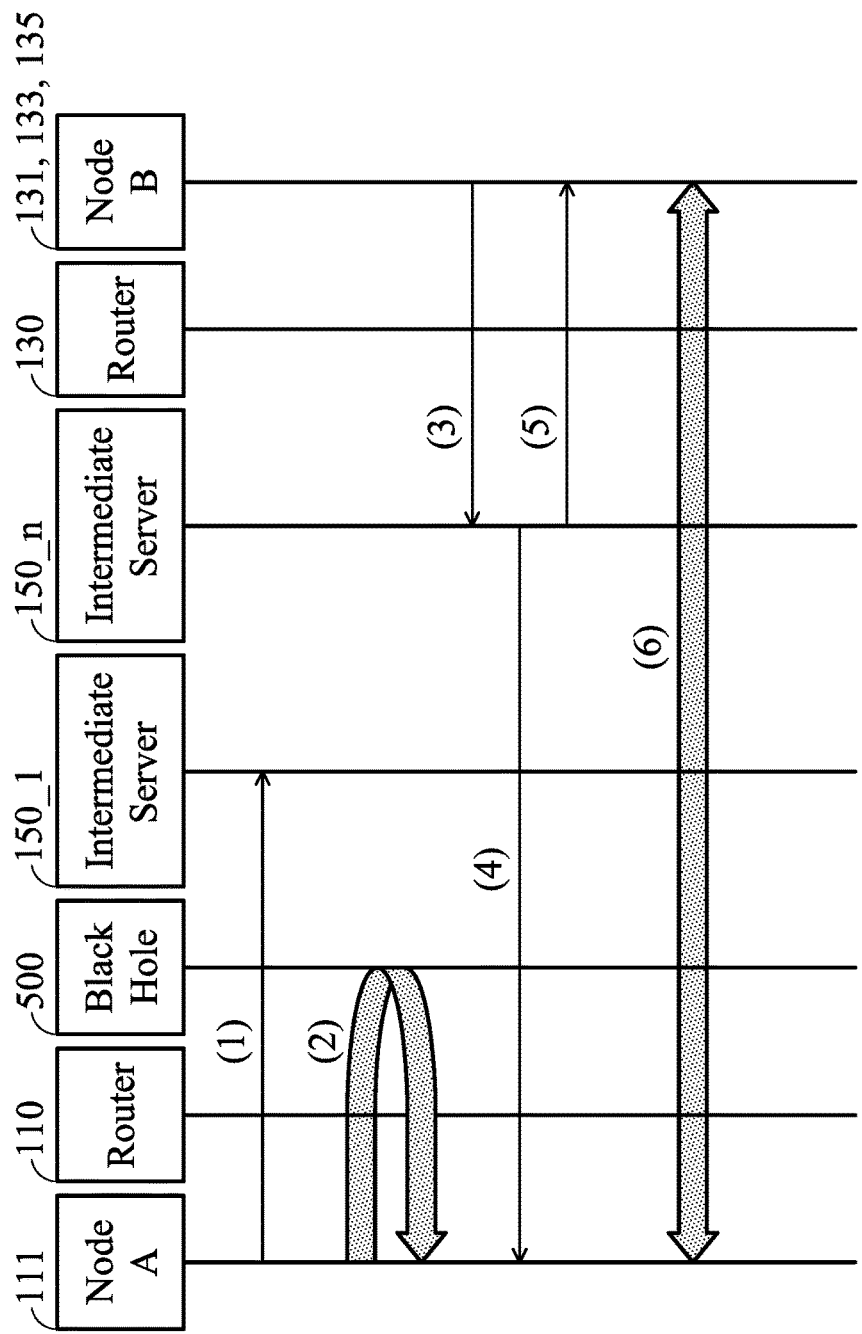
FIG. 6 illustrates a message flow of NAT traversal according to an embodiment of the invention.

A scenario is described as follows: One of the mobile phone 131, the tablet computer 133 and the personal computer 135 (hereinafter referred to as node B) behind the router 130 intends to establish a connection with the NAS system 111 (hereinafter referred to as node A). FIG. 5A to 5C are schematic diagrams of NAT traversal according to an embodiment of the invention. FIG. 6 illustrates a message flow of NAT traversal according to an embodiment of the invention. The internal address of the node A is 192.168.1.2:3456. After system boot, the node A issues an initial packet including at least ID information of the node A through the router 110 (step 1). It should be noted that, since the initial packet conforms to the TCP/IP protocol, the header of the initial packet contains the external address of the node A, so that the intermediate server 150_1 knows the external address 60.251.87.147:6543 of the node A by parsing the initial packet.

The router 110 performs NAT to assign the internal address and the external address of the node A. The intermediate server 150_1 receives the initial packet issued by the node A and records the ID information and the external address of the node A in a local database. It should be noted that the database records of the intermediate server 150_1 may be synchronized with that of the other intermediate servers 150_2 to 150_n on the fly, where n is an integer being greater than or equal to 2, so that the intermediate servers 150_2 to 150_n have capability for serving a punch request issued by the node B. Next, since the moment at which the node B intends to establish a connection with the node A cannot be predicted, the node A periodically issues a packet to a black hole 500, so as to maintain session information between the node A and the black hole 500 (step 2). Exemplary record of session information is provided as follows:

TABLE 1

| Internal address | External address | Connecting apparatus |
|---|---|---|
| 192.168.1.2:3456 | 60.251.87.147:6543 | IP:PORT (Black hole) |

The black hole 500 is an apparatus with no capability for responding to any request, or a network address binding no apparatus. In addition, the network address and the port of the black hole 500 may be predefined, and the predefined network address and the predefined port may be assigned to the node A by the intermediate server 150_1 when the node A registers its ID information to the intermediate server 150_1. In alternative embodiments, the initial packet may additionally contain the network address and the port of the black hole and the intermediate server 150_1 may record the ID information of the node A. It should be noted that the router 110 records session information between the node A and the intermediate server 150_1 when forwarding the initial packet to the intermediate server 150_1. Moreover, if the router 110 hasn't received any packet from the node A for a predetermined time interval, the session information associated with the node A will be deleted, so that the node B cannot establish a connection to the node A through the router 110. In some implementations, the node A may repeatedly send packets to the intermediate server 150_1. However, the above implementations cause the intermediate server 150_1 to use unnecessary computation resources for dealing with the packets sent from the node A.

Refer to FIG. 5B. The internal address of the node B is 192.168.6.5:4321. Since the node B does not know the external address of the node A, the node B may issue a punch request to the intermediate server 150_n through the router 130, in which the ID information of the node A is contained (step 3). The intermediate server 150_n may know the external address 60.251.87.148:1234 of the node B by parsing the packet header of the punch request. The router 130 performs NAT to assign the internal address and the external address of the node B. The intermediate server 150_n may fake an ICMP (Internet Control Message Protocol) TTL (Time To Live) packet (i.e. ICMP Error packet) between the black hole and the node A and issue the faked ICMP TTL packet to the node A (step 4). The ICMP TTL packet is fake in that it originated from the black hole with the payload containing the external address of the node B 60.251.87.148:1234. It should be noted that, since the session information between the node A and the black hole is presented in the router 110, referred to in the exemplary Table 1, the ICMP TTL packet can be forwarded to the node A. Otherwise, if the intermediate server 150_n intends to forward an ICMP TTL packet (i.e. ICMP Error packet) that originated from the node B to the node A via the router 110, the router 110 may block the ICMP TTL packet because no session information between the nodes A and B is presented therein. The router 130 performs NAT to assign the internal address and the external address of the node B. In addition, the intermediate server 150_n searches the local database according to the ID information of the node A to obtain the external address 60.251.87.147:6543 of the node A and replies with the external address of the node A to the node B (step 5).

Refer to FIG. 5C. The node B has the external address 60.251.87.147:6543 of the node A received from the intermediate server 150_n and the node A has the external address 60.251.87.148:1234 of the node B derived from the faked payload of the ICMP TTL packet. Thus, the node A and the node B have capabilities for starting the hole punching process to each other (step 6). In other words, when the node A issues a connection request to the node B according to the external address 60.251.87.148:1234 of the node B, the router 110 records session information between the nodes A and B. Therefore, when the node B issues a connection request to the node A, the connection request may be forwarded to the node A via the router 110. On the reversed path, when the node B issues a connection request to the node A according to the external address 60.251.87.147:6543 of the node A, the router 130 records session information between the nodes A and B. Therefore, the reply information made by the node A may be forwarded to the node B via the router 130. After the hole punching process is complete, the node B can request the node A for a service, such as a data access to a NAS.

Figure 7:
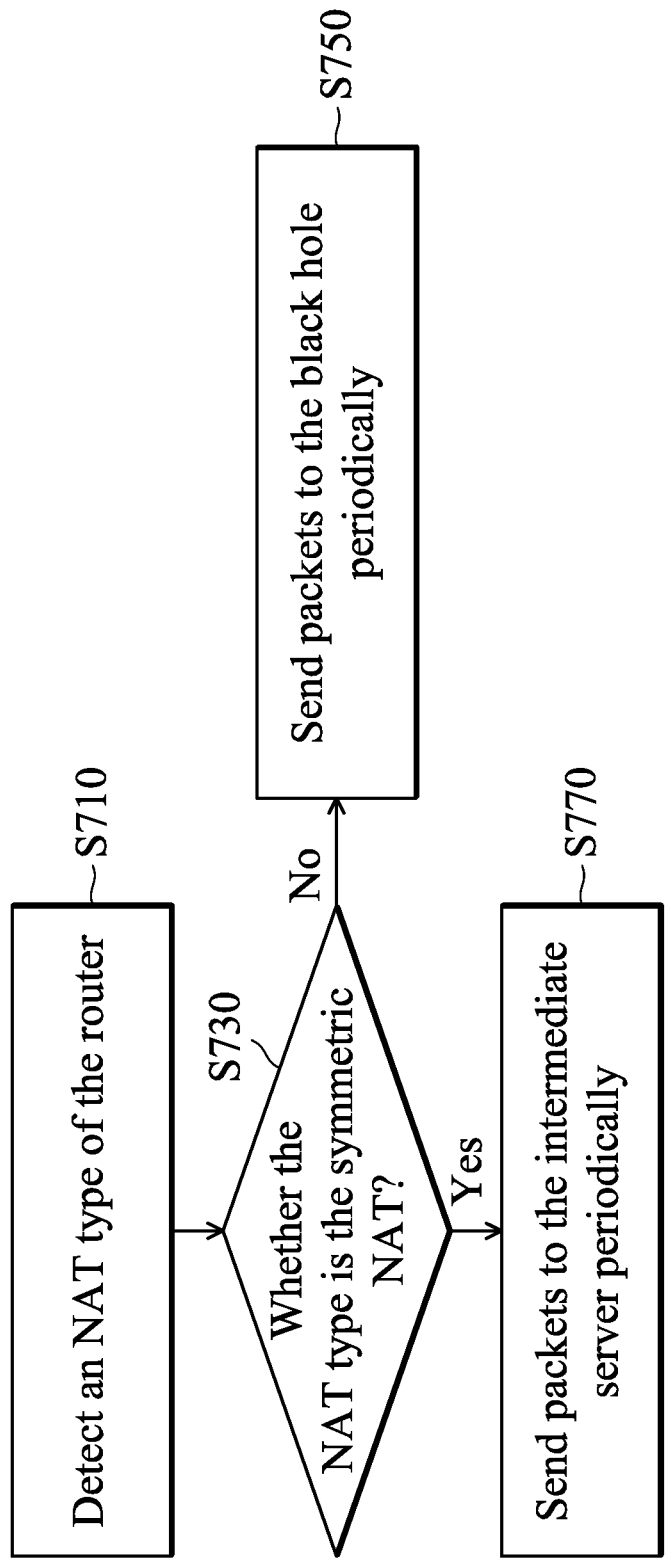
FIG. 7 is a flowchart illustrating a method for issuing outbound packets periodically according to an embodiment of the invention.

However, for nodes behind symmetric NATs, the maintenance of session information cannot be achieved by repeatedly issuing packets to the black hole. For example, when the node A issues an initial packet to the intermediate server 150_1, the node A uses a port A1 to send the packet. Moreover, when the node A periodically sends a packet to the black hole, the node A uses a port A2 (other than the port A1) to send the packet. Hence, the maintenance of session information cannot be achieved by faking the ICMP TTL packet between the black hole 500 and the node A and issuing the faked ICMP TTL to the node A. FIG. 7 is a flowchart illustrating a method for issuing outbound packets periodically according to an embodiment of the invention. The method is practiced when the processing unit 410 of the node A loads and executes relevant software code. The node A begins by detecting the NAT type of the router 110 (step S710) and determines whether the NAT type is a symmetric NAT (step S730). In step S710, the processing unit 410 may issue a query to the router 110 to ask its NAT type and receive a reply result via the communications interface 460 of the node A. If so, packets are periodically sent to the intermediate server 150_1, so that the router 110 maintains session information between the node A and the intermediate server 150_1 (step S770). Otherwise, packets are periodically sent to the black hole 500, so that the router 110 maintains session information between the node A and the black hole 500 (step S750).

Although the embodiment has been described as having specific elements in FIGS. 2 to 4, it should be noted that additional elements may be included to achieve better performance without departing from the spirit of the invention. While the process flow described in FIG. 7 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for NAT (Network Address Translation) traversal, performed by a processing unit of a first node, comprising:

issuing an initial packet to an intermediate server through a router for attempting to establish a connection with a second node through the intermediate server, wherein the initial packet comprises ID (identity) information of the first node;

periodically sending packets to a black hole instead of the intermediate server through the router, so that the router maintains session information between the first node and the black hole; and receiving a faked error packet originated from the intermediate server, wherein the faked error packet is fake in that as if the faked error packet is originated from the black hole, and a payload of the faked error packet comprises an external address of the second node.

2. The method of claim 1, wherein the black hole is an apparatus with no capability for responding to any request, or a network address binding no apparatus.

3. The method of claim 1, wherein the router's NAT type is not a symmetric NAT.

4. A method for NAT (Network Address Translation) traversal, performed by a processing unit of an intermediate server, comprising:

receiving a punch request from a first node, wherein the punch request comprises ID (identity) information of a second node; and faking an error packet between a black hole and the second node and issuing the faked error packet to the second node, wherein a payload of the faked error packet comprises an external address of the first node.

5. The method of claim 4, wherein the black hole is an apparatus with no capability for responding to any request, or a network address binding no apparatus.

6. The method of claim 4, wherein the error packet is an ICMP (Internet Control Message Protocol) TTL (Time To Live) packet.

7. The method of claim 4, further comprising:

searching a local database to obtain an external address of the second node according to the ID information of the second node; and replying with the external address of the second node to the first node.

8. A system for NAT (Network Address Translation) traversal, comprising:

a first node issuing an initial packet to an intermediate server through a router for attempting to establish a connection with a second node through the intermediate server, wherein the initial packet comprises ID (identity) information of the first node; determining an NAT type of the router; and, when the NAT type is not a symmetric NAT, periodically sending packets to a black hole instead of the intermediate server through the router, so that the router maintains session information between the first node and the black hole;

wherein the intermediate server fakes an error packet between the black hole and the first node and issues the faked error packet to the first node, and a payload of the faked error packet comprises an external address of the second node.

9. The system of claim 8, wherein, when the NAT type is a symmetric NAT, periodically sending packets to the intermediate server through the router, so that the router maintains session information between the first node and the intermediate server.

10. The system of claim 8, wherein the black hole is an apparatus with no capability for responding to any request, or a network address binding no apparatus.

11. The system of claim 8, wherein the NAT performed by the router is not a symmetric NAT.

12. The system of claim 11, wherein the intermediate server receives a punch request from a second node, the punch request comprises the ID information of the first node.

13. The system of claim 12, wherein the error packet is an ICMP (Internet Control Message Protocol) TTL (Time To Live) packet.

14. The system of claim 12, wherein the intermediate server searches a local database to obtain an external address of the first node according to the ID information of the first node; and replies with the external address of the first node to the second node.

15. The system of claim 14, wherein the first node obtains the external address of the second node from the payload of the error packet, so that the first node and the second node have capabilities for starting a hole punching process.

* * * * *